United States Patent
Spencer

(10) Patent No.: US 8,984,156 B2
(45) Date of Patent: Mar. 17, 2015

(54) MULTI-PARTY MESH CONFERENCING WITH STREAM PROCESSING

(75) Inventor: Percy L. Spencer, Falmouth, ME (US)

(73) Assignee: salesforce.com, inc., San Francisco, CA (US)

( * ) Notice: Subject to any disclaimer, the term of this patent is extended or adjusted under 35 U.S.C. 154(b) by 224 days.

(21) Appl. No.: 13/554,910

(22) Filed: Jul. 20, 2012

(65) Prior Publication Data

US 2013/0191485 A1 Jul. 25, 2013

Related U.S. Application Data

(60) Provisional application No. 61/510,118, filed on Jul. 21, 2011.

(51) Int. Cl.
| | | |
|---|---|---|
| G06F 15/16 | (2006.01) | |
| H04N 7/14 | (2006.01) | |
| H04L 29/06 | (2006.01) | |
| H04L 12/18 | (2006.01) | |

(52) U.S. Cl.
CPC .............. *H04L 65/608* (2013.01); *H04L 65/80* (2013.01); *H04L 65/4038* (2013.01); *H04L 12/1822* (2013.01)
USPC .......................... 709/231; 709/204; 348/14.08

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,805,762 A * | 9/1998 | Boyce et al. .................. | 386/314 |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |

(Continued)

*Primary Examiner* — Ranodhi Serrao
(74) *Attorney, Agent, or Firm* — Blakely Sokoloff Taylor & Zafman LLP

(57) ABSTRACT

Conferencing between multiple parties can be performed with mesh conferencing. In one example, conference streams are received directly or indirectly from different client nodes at a mesh conferencing node. A priority is assigned to each stream before or after the streams are received. At least one stream is selected based on the assigned priorities to send to another node, such as a client node or a second mesh conferencing. node. Using the priorities, the streams may also be scaled or compressed before being sent to the next node.

19 Claims, 12 Drawing Sheets

(56) References Cited

U.S. PATENT DOCUMENTS

| | | |
|---|---|---|
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 * | 9/2003 | Scherpbier et al. ........... 370/532 |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,003,033 B2 * | 2/2006 | Kim et al. ..................... 375/240 |
| 7,224,730 B2 * | 5/2007 | Kim et al. ................. 375/240.08 |
| 7,340,411 B2 | 3/2008 | Cook |
| 7,389,357 B2 * | 6/2008 | Duffie et al. .................. 709/235 |
| 7,426,578 B2 * | 9/2008 | Jones et al. ................... 709/248 |
| 7,620,655 B2 | 11/2009 | Larsson et al. |
| 7,844,725 B2 * | 11/2010 | Labonte et al. .............. 709/231 |
| 7,930,421 B1 * | 4/2011 | Bertz et al. .................... 709/231 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0254843 A1 * | 10/2009 | Van Wie et al. .............. 715/757 |
| 2010/0146085 A1 * | 6/2010 | Van Wie et al. .............. 709/220 |
| 2011/0072366 A1 | 3/2011 | Spencer et al. |

* cited by examiner

MULTI-PARTY MESH CONFERENCING WITH STREAM PROCESSING

CLAIM OF PRIORITY

This application claims the benefit of U.S. Provisional Patent Application 61/510,118 entitled Method for Application Performance and Capacity Analysis, by Barry Spencer, filed Jul. 21, 2011, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present description relates to the field of connecting multiple parties together in a conference and, in particular, to processing the distribution of streams between the parties.

BACKGROUND

Video conferencing and web conferencing are becoming more ubiquitous as means for communicating. For example, in a corporate environment, some employees might work remotely, away from a company's main headquarters. As a result, when the users need to communicate on a project, they might either use telephone or voice conference or video conference technologies. Teleconference technology does not include a video stream and therefore does not the participants to see each other. However in some cases, such as some web conferencing technologies, participants can share documents and files on a shared screen.

Being able to see and more directly address others is a key aspect of communication. Video conferencing technologies allow users to see and interact with each other. However, there are difficulties in handling multiple users in the same conference. For a large number of users, a large number of data streams are required. This can overly burden connections between users or force the system to provide an unacceptably low level of video quality.

BRIEF SUMMARY

Conferencing between multiple parties can be performed with mesh conferencing. In one example, conference streams are received directly or indirectly from different client nodes at a mesh conferencing node. A priority is assigned to each stream before or after the streams are received. At least one stream is selected based on the assigned priorities to send to another node, such as a client node or a second mesh conferencing. node. Using the priorities, the streams may also be scaled or compressed before being sent to the next node.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Figure 1:
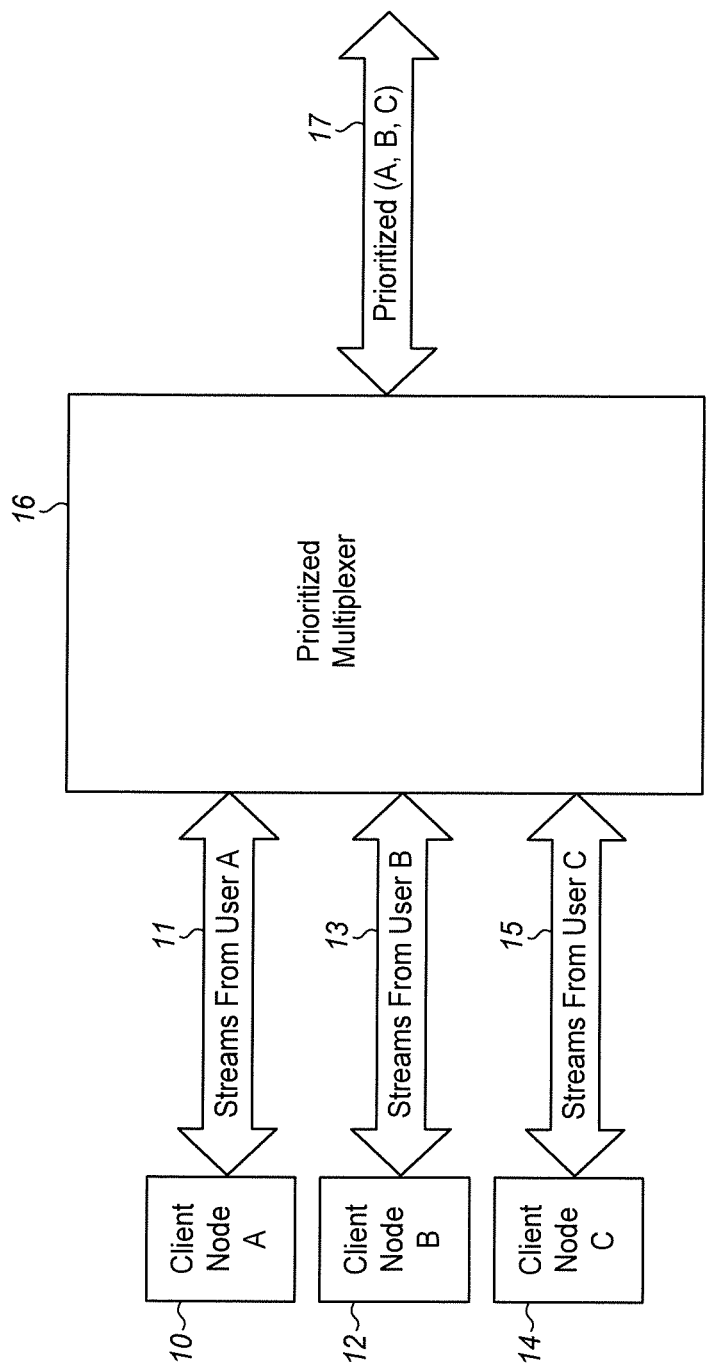
FIG. 1 is a block diagram of client nodes coupled to a mesh conferencing node in an embodiment.

Embodiments of the present invention provide tools and techniques for managing multiple data streams and these are illustrated in the figures below. In those figures, a few different components are illustrated including, but not limited to: grandparent nodes, parent nodes, and child nodes. These nodes are meant to illustrate a hierarchical relationship that may exist between nodes that multiplex data streams over a network. A node as used herein can be a streaming server, a client on a network, or some computing resource that can receive, analyze, prioritize, and/or forward streamed data. Accordingly, as illustrated, multiple data streams can be prioritized and then fed into a multiplexor. In one implementation, the multiplexor is a node (e.g., a grandparent node or a parent node). One multiplexor can then forward that to another node, where the data streams are again prioritized and forwarded on.

In one implementation, every data stream to, from, and between clients is prioritized, meaning it is assigned a priority level. The priority level of a data stream can be calculated based on various factors. For example, one factor might be activity level. In a conferencing context, when someone is talking that person's data stream tends to get higher priority over others.

Other factors might include the type of media being streamed. For example, audio may be higher prioritized because hearing what other people are saying is more important and people are accustomed to high quality audio resolution and sound. Video, text, and other media types can be prioritized based on performance (e.g., how much bandwidth they use, user expectations, user-defined configuration, etc.)

In one implementation, the platform streaming data is media agnostic. In other words, it doesn't know (or need to know) the types of media it is streaming. It just streams what it is given based on the priority level assigned to a stream.

In one implementation, as alluded to above, the data streams can be assigned a priority level by a moderator. For example, a moderator may determine that a certain user's input is more important than others and prioritize it accordingly. A simple use case is a video/web conference that includes the company's CEO (Chief Executive Officer). Regardless of the discussion, type of media, etc., the moderator may determine that the CEO has higher priority than others and assign an appropriate priority level to the CEO's data streams. Another example is a panel discussion, where the members of the panel have a higher priority level assigned to them. When a question is asked, the person asking the question may get a bump in their priority, but as soon as the questioner stops talking, all the panel members' data streams resume at the highest priority, giving them the most bandwidth and prominence in the discussion.

In one implementation, all data streams are labeled with prioritization information. Each client in a video/web conference environment delivers streams to a server. The server responds back to the client with the highest priority level data streams. Those data streams are displayed on the client screen, with a few exceptions. The system knows better than to echo back audio, more a factor in selection of streams.

The system may also measure how much bandwidth a user has. The system then picks and chooses which data streams to send to the user. In some case, it may limit the number of data streams sent to a user and alternate between streams as each data stream's priority level changes.

The described embodiments provide many benefits as compared to Client/Server (single node) system. These include that the latency between local users is greatly reduced. Calls can be routed between data centers on a private backend network (edge). The call capacity (number of participants) is no longer constrained by the CPU and bandwidth availability of a single machine. Calls which are entirely contained on a single private network require no bandwidth to or from a data center (supernode). Calls which are partially contained on a single private network in many cases will require less bandwidth to or from a data center (hybrid).

FIG. 1 is a block diagram of a group of client nodes 10, 12, 14 which provide streams 11, 13, 15 from their respective users A, B, C to a mesh conferencing node 16. The mesh conferencing node prioritizes and multiplexes the received streams and provides them as an output 17 to further downstream nodes. Each client can be a user computer terminal, a specialized conferencing appliance or even a portable device such as smart phone. Client node 10 produces video, audio or other shared data from user A. This data may be provided as separate streams 11 or as a single multiplexed stream to the mesh conferencing node 16. Similarly user B uses its client node 12 to provide streams 13 of audio, video, shared data and any other desired data to the mesh conferencing node 16. The client node 14 for user C also provides a stream 15 to the multiplexer. The multiplexer 16 similarly provides streams from upstream equipment (not shown) to each of the client nodes 10, 12, 14.

For each input stream received at the mesh conferencing node 16 the node may include the full stream received from the user into its output 17, scale the stream to a lower bandwidth, or eliminate the stream all together. The determination of how to handle, process, and forward user streams may be made as a function of the available output bandwidth for the combined streams, the priority of the input streams, and other stream characteristics. The conferencing node 16 controls which user streams are forwarded to higher level equipment and which streams are sent to each client node. As a result, the total bandwidth required to provide all three user streams to upstream equipment is controlled through this mesh conferencing node. Similarly, the bandwidth between each client node and the conferencing node can also be controlled at the conferencing node.

Figure 2:
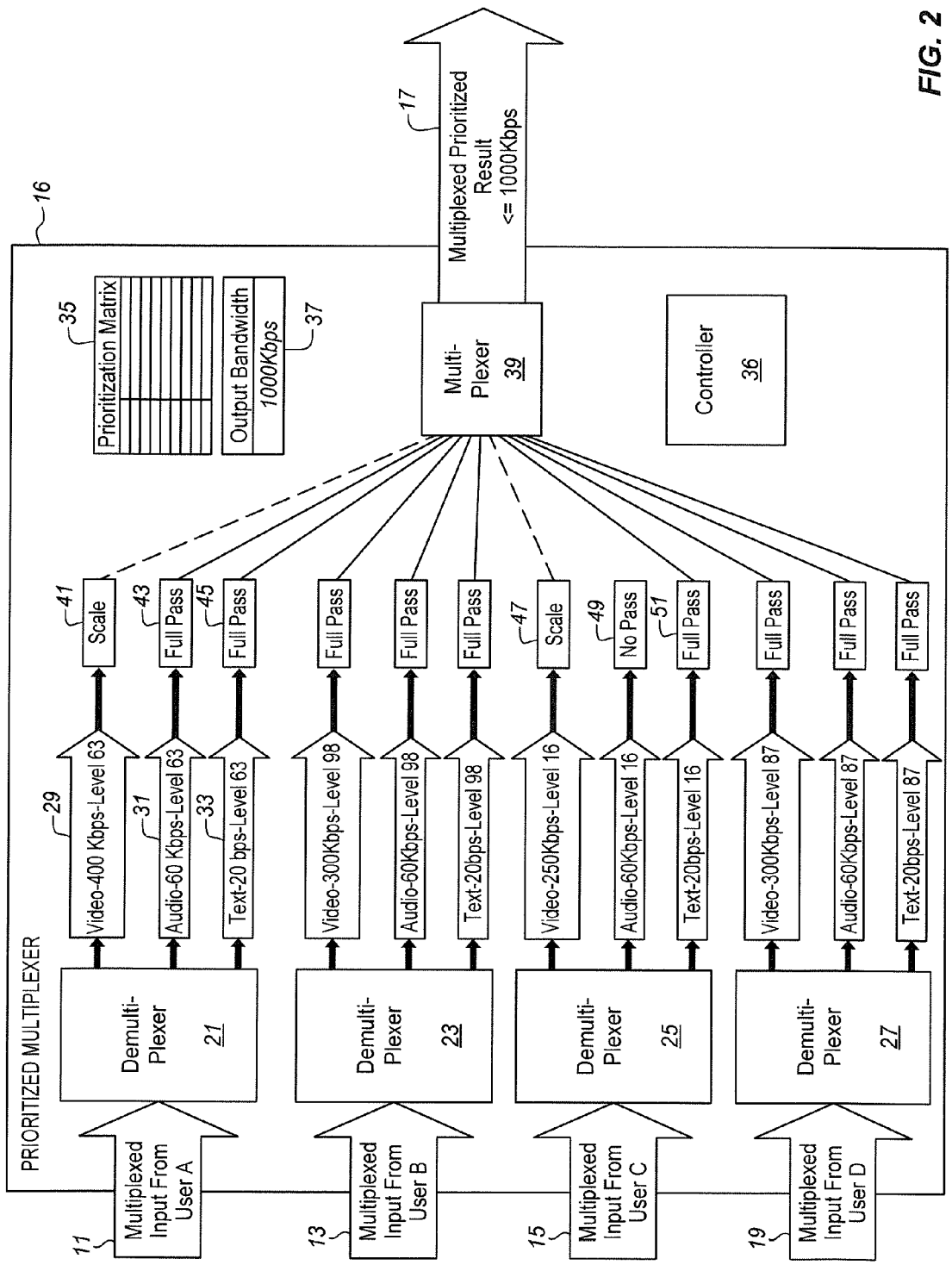
FIG. 2 is a block diagram the mesh conferencing node of FIG. 1 in an embodiment.

FIG. 2 shows an example of the mesh conferencing node 16 of FIG. 1 in greater detail. The mesh conferencing node has an input from four different users A, B, C and D. Each user provides a multiplexed input stream 11, 13, 15 and 19. These streams are applied into demultiplexers 21, 23, 25 and 27. Only input user streams are shown in this example, however, similar techniques and equipment may be used to send multiplexed streams from the mesh conferencing node 16 to each individual user A, B, C, and D. While only four users and user streams are shown more or fewer may be used depending on the particular implementation. In addition, streams from more than one user may be combined or multiplexed into a single input stream.

The input from user A—11 is applied to a demultiplexer 21 which separates out in this example a video component 29, an audio component 31, and a text component 33. The video component is a 400 kilobit per second video stream, the audio component is a 60 kilobit per second audio stream, and the text component requires 20 bits per second. The system refers to a prioritization matrix or table 35 resident on the conferencing node. The prioritization matrix may be received from a remote source or it may be developed independently by the mesh conferencing node. In one example, the mesh conferencing node 16 creates a prioritization matrix based on information about each of the users and then scales its processes based on total allocated bandwidth. In the example of FIG. 2, the output bandwidth is listed in a parameter 37 as being one thousand kilobits per second. As a result, the multiplexer must keep its output to a bandwidth below 1000 kilobits per second.

The prioritization matrix 35 ranks each stream from each user. The table is used by a controller 35 coupled to the table and the bandwidth parameter 37 to decide which streams could be passed through to an output multiplexer 39 intact and which streams should be scaled or removed. In the present example, the prioritization matrix has one entry for each active stream. The stream from user A has been given a priority of 63 based on the priority in the matrix. As a result, the video 29 is applied to a scaler 41 which reduces the bit rate of the video either by compressing it or reducing its resolution. The audio 31 is passed straight though an audio scaler 43 without modification and the text 33 is similarly passed through a text scaler 45 without modification. The three components of the stream from user A as modified are then all applied to the output multiplexer 39.

The video can be more easily scaled when it is received in the form of a scalable video codec. SVC (Scalable Video Coding of of Annex G of the H.264, MPEG4 video encoding) encoding, for example, produces a high quality video bitstream with one or more subset bitstreams This codec allows the video data rate to be scaled by selecting combinations of the subset bitstreams that fit within the allocated bandwidth. Transcoding can be performed simply by dropping some number of the video subset bitstreams. With other codecs or formats, it may be necessary to decode the video apply compression, interleaving, or some other scaling technique and then encode the video. The particular choice of video and audio codecs may be adapted to suit any particular implementation.

As shown, text typically requires far less bandwidth than audio and video. In the illustrated example the text for each of the users comes in at 20 bits per second and is not scaled for any of the users regardless of the prioritization of each user. On the other hand, video requires 250 to 400 kilobits per second in these example so it is scaled. User B in this example, has been assigned a higher priority level than user A at 98. Its video, audio, and text are all sent to the multiplexer with no scaling compression or reduction. User C, on the other hand, has been assigned a much lower priority level of 16 in this example. The video, even though it is only at 50 kilobits per second, is scaled in a scaler 47 before being passed to the multiplexer. The audio blocked in an audio scaler 49 and the text is allowed to pass through in a text compressor 51. User D has been assigned a medium high priority of 87 and its video audio text is all passed through without change.

In any of these cases, for example with user C at priority 16, the entire stream from user C may be blocked by the prioritization matrix and multiplexers in order to keep the bandwidth at the output 17 below 1000 kilobits per second as provided in a bandwidth parameter storage 37. Similarly, streams from other users such as user A at priority level 63 may also be blocked.

The total allowed bandwidth 37 can be achieved using a mix of scaling 41, 47, blocking 49 and passing 43, 45, 51 depending on the data required by each user and the priority allocated to each user. These streams are combined in the multiplexer 39 after they have been modified or passed through and sent in an output multiplex stream 53 to other conferencing nodes.

Figure 3:
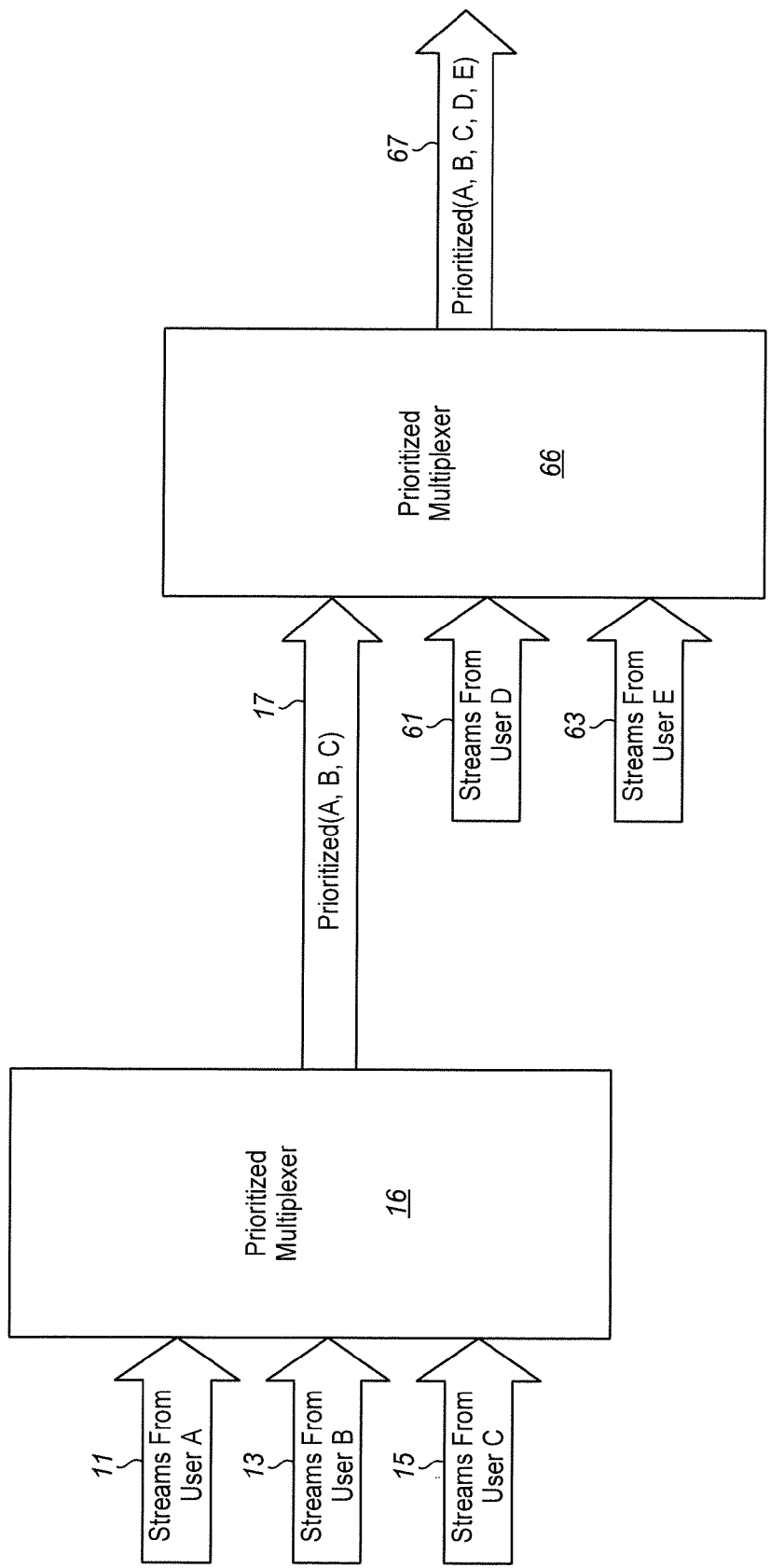
FIG. 3 is a block diagram of a sequence of two mesh conferencing nodes in an embodiment.

FIG. 3 is a block diagram of a sequence of two mesh conferencing nodes 16, 66 showing how streams from different users can be combined as they are received. Similar to FIG. 1, the first mesh conferencing node 16 receives three streams 11, 13, 15 from each of three users A B and C. These are combined together as shown for example in FIG. 2 and provided as a multiplexed output 17 to further upstream mesh conferencing node.

A first one of these upstream mesh conferencing nodes 66 receives the multiplexed user stream 17. This node also receives a stream from user D 61 and a stream from user E—63. This node then combines the two streams from users D and E with the already multiplexed streams from users A B and C to provide a multiplexed output 67 which includes streams or portions of streams from users A B C and E. All or portions of any one or more of these streams may be scaled or blocked before being multiplexed into a single stream. In addition, instead of multiplexing, the streams may be combined in any of a variety of other ways.

Figure 4:
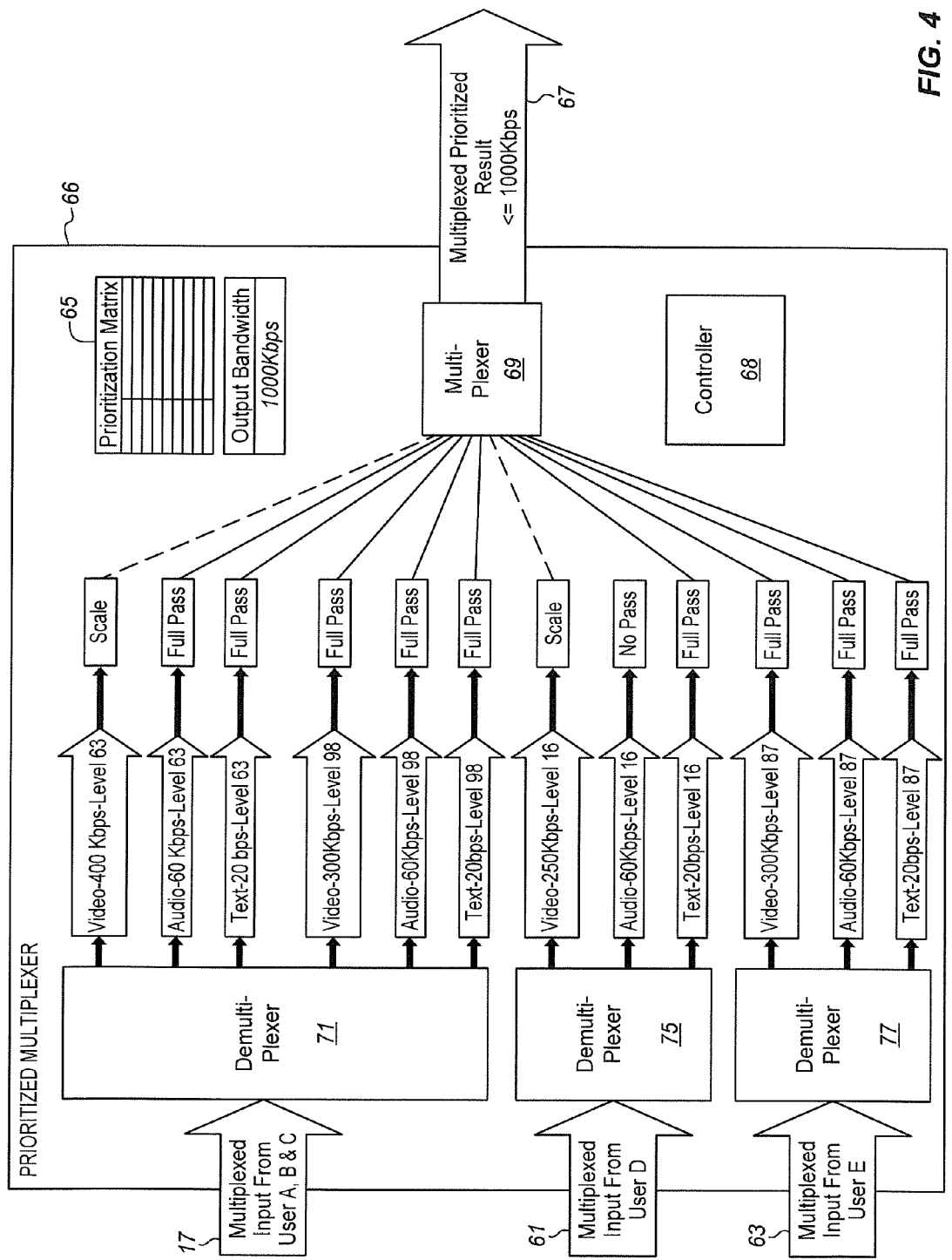
FIG. 4 is a block diagram of the second mesh conferencing node of FIG. 3 in an embodiment.

FIG. 4 is a block diagram showing the upstream mesh conferencing node 66 in more detail. As in the example of FIG. 2, the node 66 receives inputs from individual users D and E 61, 63 that are broken up by demultiplexers 75, 77 into individual constituent components of, in this example, video, audio, and text. The components are processed according to the priorities assigned to each user and contained in a prioritization matrix 65. The demultiplexed streams are either scaled, blocked, or passed into a multiplexer 69 to be provided on to the multiplexed output stream 67. In the same way, the combined multiplexed streams 17 from multiple users are also applied to a demultiplexer 71 which breaks the streams into their component parts for each of the included users. In this case streams from users A B and C are included and broken into components. These streams are each scaled, passed, or blocked based on the priorities assigned to each of those users. The scaled streams are then passed on to the multiplexer 69 to be combined with the streams from users D and E. As in the example of FIG. 2, the prioritization matrix ranks each stream and a controller 68, using the matrix, decides which streams should be passed through intact, scaled, or removed. In this case, the prioritization matrix has one entry for each user which is then applied to the stream for that user. The controller can also control and set parameters for the demultiplexers 71, 75, 77 and the scalers. As in the other examples, the scalers may be transcoders, compressors, or any other suitable component that is able to reduce the bandwidth required to carry the video, audio text or other data.

Figure 5:
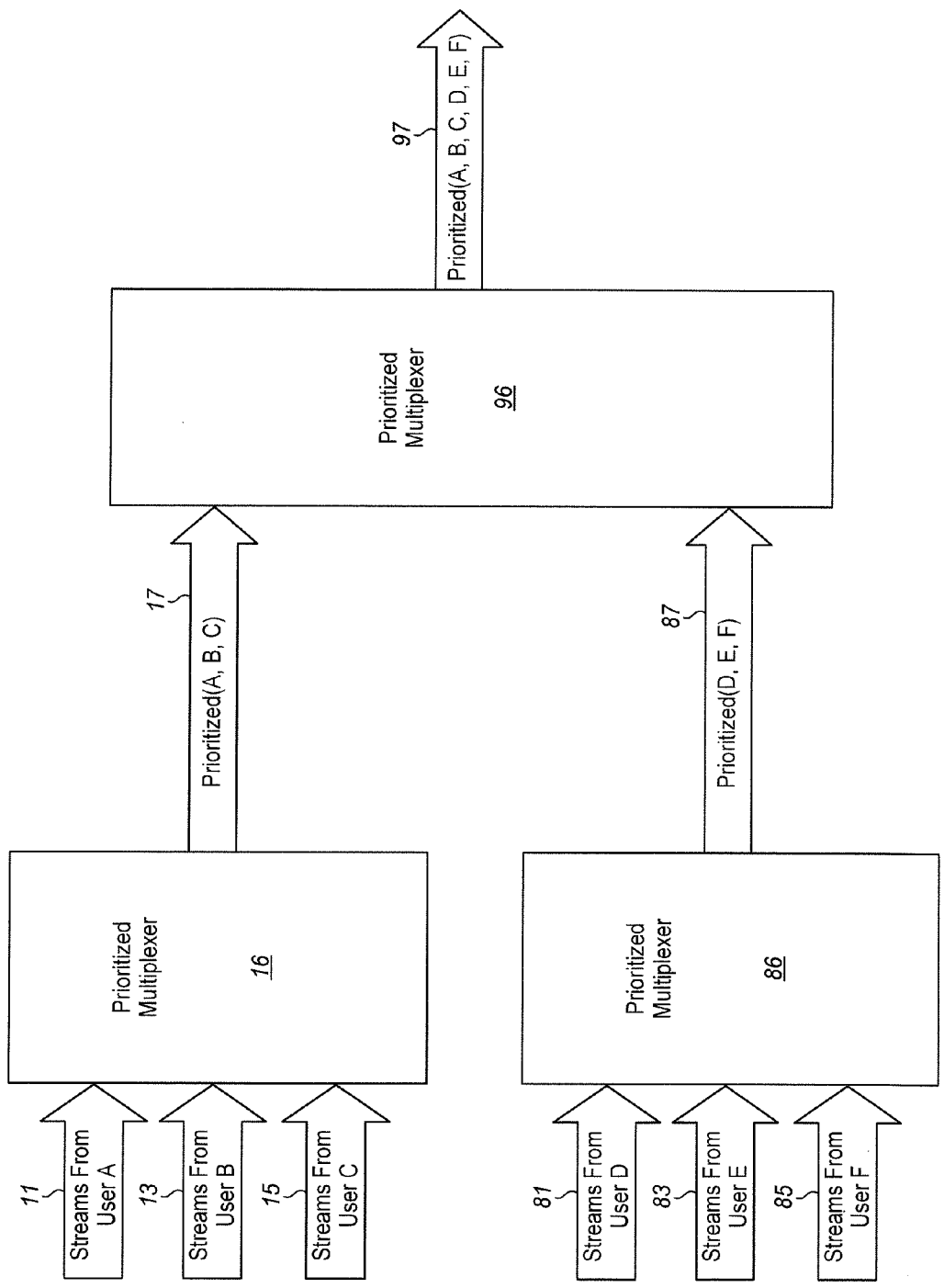
FIG. 5 is a block diagram of tiered mesh conferencing nodes combining streams in an embodiment.

FIG. 5 is a block diagram of another example of tiered mesh conferencing nodes that combine streams from multiple users. The first mesh conferencing node 16 receives streams 11, 13, 15 from users A, B, and C. These are combined and multiplexed depending on the priorities by that first mesh conferencing node 16. The multiplexed prioritized output 17 is provided to an upstream mesh conferencing node 96. Similarly, a second mesh conferencing node 86 receives streams 81, 83, 85 from users D, E, and F these are combined and prioritized into a prioritized output stream 87 which is also applied to the upstream node 96. The upstream node 96 demultiplexes each of these streams, applies its priorities and rankings, and feeds them onto a scaled, prioritized output 97.

FIGS. 1, 3, and 5 show that individual streams or combined streams from different users can be further combined as signals are fed upstream from each of the users to higher level nodes. Each of the mesh conferencing nodes may have its own prioritization matrices based on available bandwidth and based on those users that are being processed by that matrix. So, for example in a first tiered node 16 which receives streams from three users, the stream from user C for example at priority level 16 is still passed through even if it is scaled. However when user C's stream reaches a further upstream multiplexer 96, that stream at priority level 16 may be competing with streams from other higher priority users and may therefore become completely blocked in order to allow at least some portion of the higher priority streams to pass through. In this way each node maintains it multiplexed outputs within its allowed bandwidth and yet the important streams are still passed through.

Figure 6:
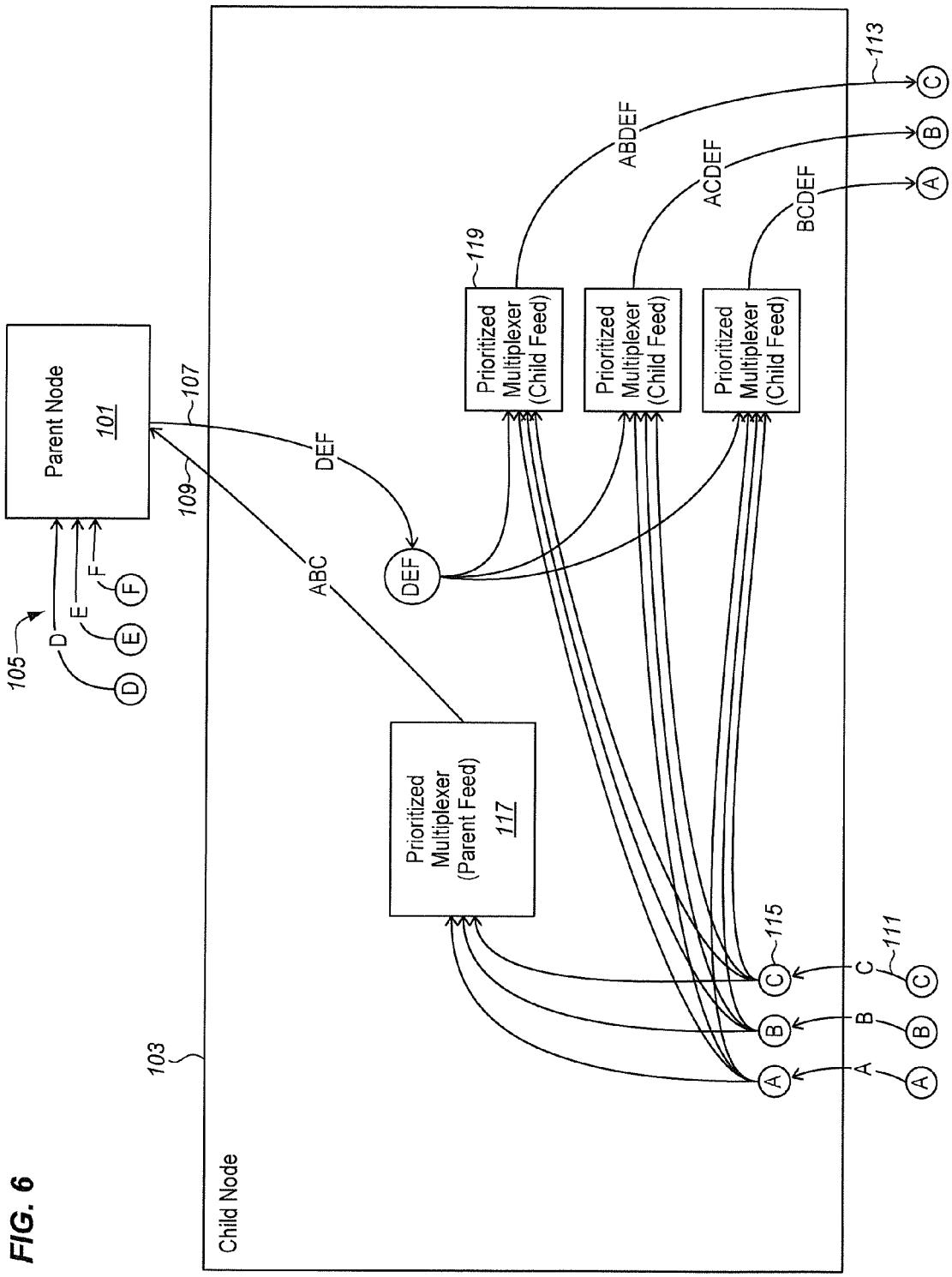
FIG. 6 is a block diagram of tiered parent and child mesh conferencing nodes in an embodiment.

FIG. 6 is a block diagram of a parent node 101 and a child node 103 coupled together to send streams from one to the other. The parent node 101 receives streams 105 from users D, E, and F. It passes these streams through a stream output 107 to the child node 103. The parent node receives streams 109 from users A, B, and C from the child node 103. The child node is coupled to user stream inputs 111 for users A, B, and C and user stream outputs 113 for users A, B, and C. The streams for users A, B, and C are passed into demultiplexers 115. The demultiplexers pass the streams into a prioritized multiplexer 117 similar to that of FIG. 2. The prioritized multiplexer combines the streams from users A, B, and C prioritizes, and multiplexes them, and passes them through an output 109 to the parent node.

The demultiplexers also pass the demultiplexed streams 116 from users A, B, and C to prioritized output multiplexers 119, one for each of the user output streams 113. The user output multiplexers 119 receive the demultiplexed streams 116 from users A, B, and C as well as the demultiplexed streams from users D, E, and F 107 from the parent node. The streams are then prioritized and multiplexed to produce a unique output stream 113 that is received at each client node A, B, C. The output streams received at users D, E, and F are not shown in FIG. 6 in order to simplify the drawing.

As shown, the output corresponding to each user A, B, C is made up of a combination of the streams of each of the other users. Accordingly, user A outputs the stream for user A but receives the stream for users B, C, D, E, and F. The output from user B is users B's stream and the input for user B is streams A, C, D, E, and F. Similarly, user C outputs the stream for user C and receives the stream for users A, B, D, E, and F. Each child node 103 has its own prioritized multiplexer 117 for input and prioritized multiplexer 119 for output. Part of the prioritization on the output is to remove the users' owns feeds unless a user has specifically requested that a stream be echoed or in some other way has requested that it receive its own stream for some other reason. As shown in FIG. 6, the streams received from users A, B, and C are passed directly to the output multiplexers for the users A, B, and C without being prioritized or passed from the child node 103 to the parent node 101. This allows any prioritizing, scaling, or blocking necessary for the link between the child and the parent node to be avoided for those users local to the child node 103. As a result the local users A B and C are able to receive the feed of the other local users more quickly with less manipulation than those of the remote users D, E, and F coupled to the parent node.

Figure 7:
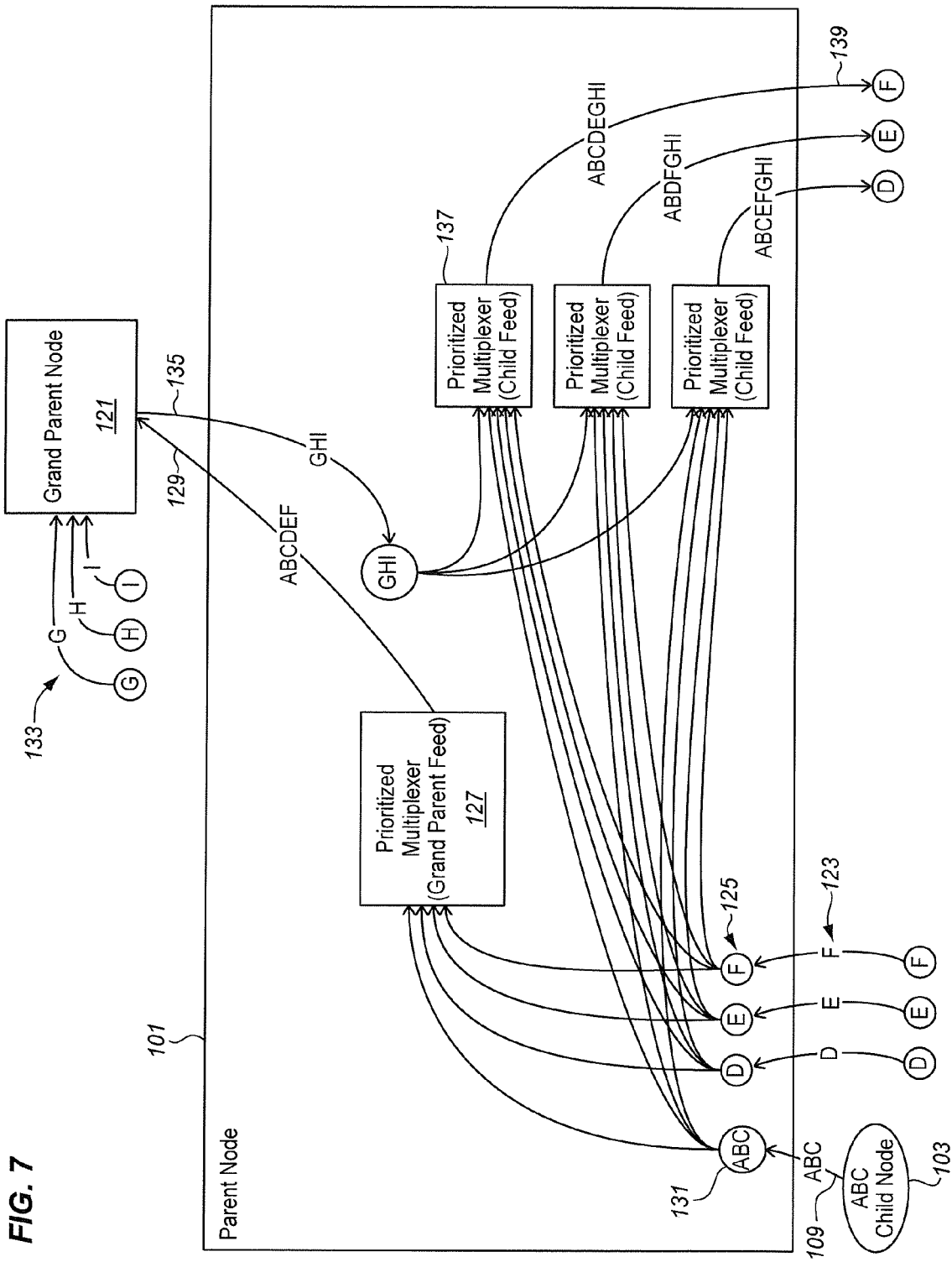
FIG. 7 is a block diagram of tiered grand parent and parent mesh conferencing nodes in an embodiment.

FIG. 7 shows how the principles of FIG. 6 can be applied to the parent node 101 to communicate with a further upstream mesh conferencing node 121, identified here as a grandparent node. While a child node 103, parent node 101, and grandparent node 121 are shown, the architecture may be extended to include many parents, many children, grandparents, great grandparents, etc. The mesh conferencing nodes may be tiered and a hierarchy established for each set of users connected to each conferencing node. The bottom tiered or lowest level of the hierarchy shown in FIG. 6 is the child node and an intermediate level or second level of the tiered hierarchy is the parent node 101.

Similar to the child node of FIG. 6, the parent node receives input streams 123 from each of the users coupled directly to that node. In this case, users D, E, and F at client nodes transmit input streams 123 to demultiplexers 125. The demultiplexed signal is sent to a prioritized multiplexer 127. The child node 103, as discussed above, provides a prioritized multiplexed output stream 109 to the parent node 101 this is also applied to a demultiplexer 131 and the demultiplexed signals from users A, B, and C are also sent to the multiplexer 127. The multiplexer combines the input streams from users D, E, and F with input streams from users A, B, and C 109 to create a prioritized scaled multiplexed output stream 129. The output stream 129 is sent to the grandparent node 121. The output applied to the grandparent node 121 combines signals from users A, B, C, D, E, and F. While only one grandparent node is shown, the output signal 129 may be applied to more than one upstream mesh conferencing node.

The grandparent node receives its own users' output streams 133 from users G, H, and I. These are prioritized and multiplexed into a combined output stream 135 that is sent to the parent node 101. The parent node demultiplexes these streams and applies them to a set of output prioritized multiplexers 137. The output prioritized multiplexers receive individual demultiplexed streams from users A, B, and C, received from the child node, and from users D, E, and F, received directly, and from users G, H, and I received from the grandparent node.

The streams are prioritized and multiplexed based on the overall prioritization stream and on the needs of each individual user at the parent node. A separate stream 139 is provided as an output to each of the three client nodes D, E, and F that are coupled to the parent node. While only three client nodes D, E, and F are shown in FIG. 7, there may be fewer or many more than shown. Many more streams may be combined in the prioritized multiplexers 137 127 within the parent node and within any of the other mesh conferencing nodes. As in the example of FIG. 6, the output prioritized multiplexers can provide an output stream 139 which does not include a user's own input stream but only those of other users. User client node D for example is shown as receiving streams from users A, B, C, E, F, G, H, and I. However any one of those streams may be blocked as having a low priority to reduce the overall bandwidth constraints or to reduce the scaling required to carry streams from the other users.

Figure 8:
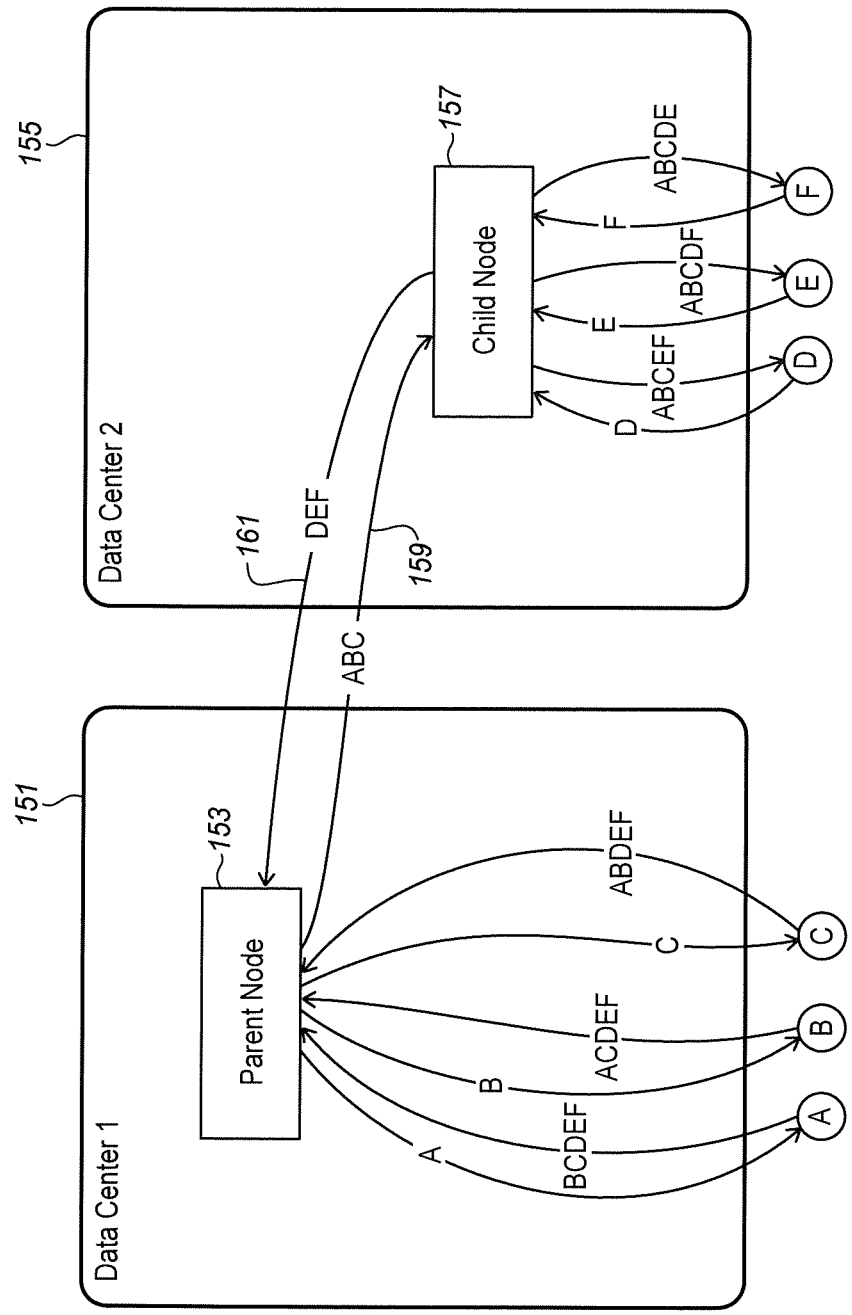
FIG. 8 is a block diagram of parent and child mesh conferencing nodes in different data centers in an embodiment.

FIG. 8 is an example of how multiple parent and child nodes may communicate different data streams between data centers in order to send streams from multiple users to other users. A first data center 151 in a first region has a parent node 153 coupled to at least three client nodes A, B, and C. The client nodes for A, B, and C are not in the data center but are in the same region. The data center receives uplink streams A B and C from each of the three client nodes and sends downlink multiplexed prioritized streams back to each client node A, B, C. The parent node at Data Center 1 also sends a prioritized multiplexed stream combining data from client nodes A, B, and C to a second data center 155 in a second region.

The second data center 155 has a child node 157 which may be a parent, grandparent, child or other tier node. The child node 157 of the second data center 155 receives the multiplexed stream from users A, B, and C 159 and sends a prioritized, multiplexed stream 161 for its users to the parent node 153 of the first data center 151. As shown in FIG. 8, client node A provides an input data stream having its data A and receives an output stream from the parent node which has streams from users B, C, D, E, and F. Similarly, each of the other nodes, B, C, D, E, and F, using this architecture can provide their own input stream into a meshed conferencing node 153, 157 and receive back a stream from all or many of the other client nodes in the meshed conference.

Figure 9:
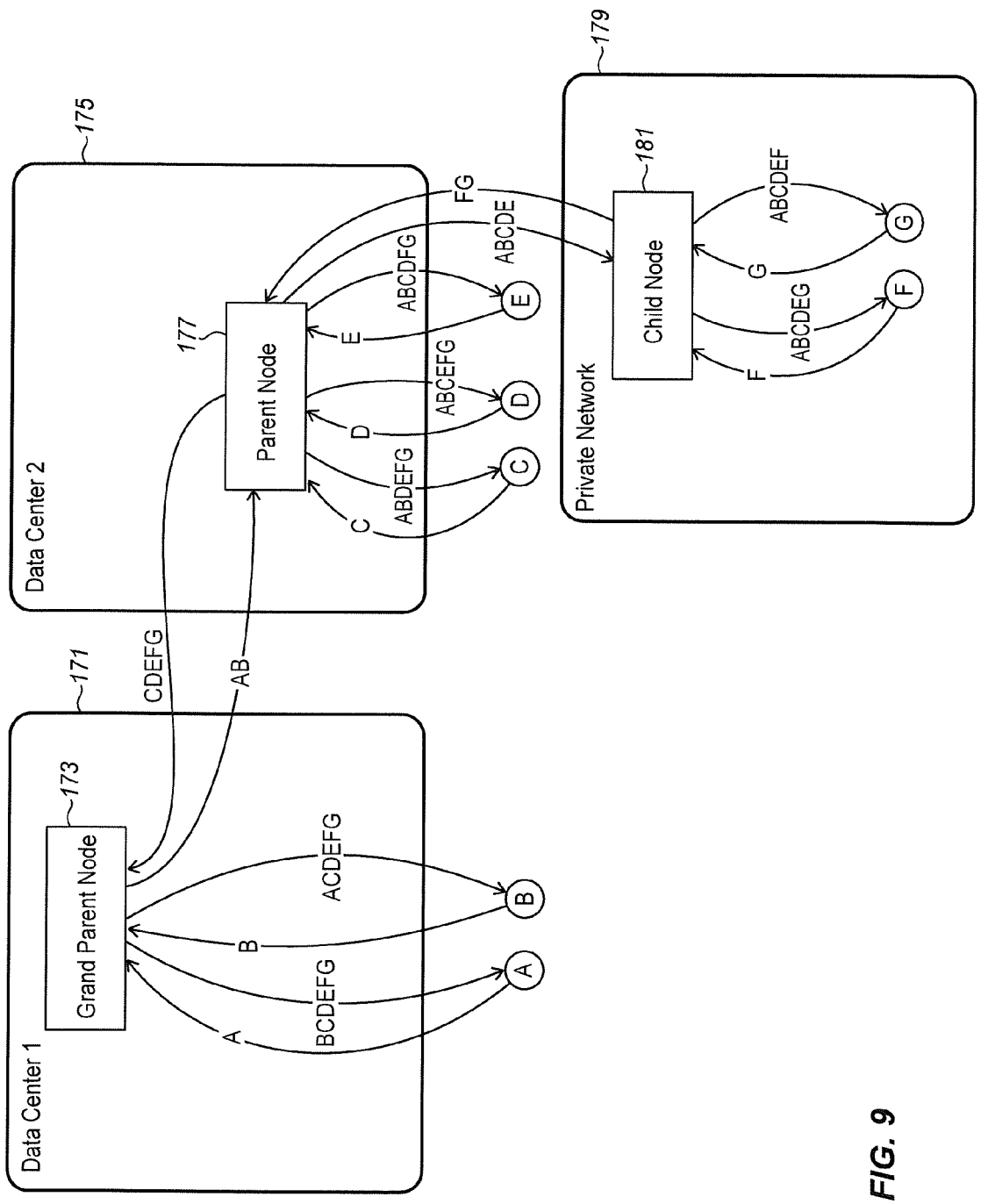
FIG. 9 is a block diagram of tiered mesh conferencing nodes in different networks according to an embodiment.

FIG. 9 is a block diagram of a more complex network architecture that includes seven participants A, B, C, D, E, F, and G spanning two regions where the users F, G in one of the regions are in a private network. A first region has a first data center 171, Data Center 1 and a second data center 175, Data Center 2. Data Center 1 serves client nodes A and B. These client nodes communicate with a grandparent node 173 of the data center. The client nodes send upstream input data as their own user stream and receive downstream or output data from all the other users coupled to or through the grandparent node 173. As mentioned above, the client nodes may receive streams only from some subset of the other client node, depending on any scaling or blocking that may have occurred in the multiplexers or in scalers.

Data Center 2 175 has at least one other meshed conferencing node 177 indicated in this example as a parent node. The parent node in the second data center of the first region receives a prioritized multiplexed stream from the grandparent node 173 in the first region 171 and sends streams back to the grandparent node data from some or all of the other users in the network C, D, E, F, and G. The parent meshed conferencing node is coupled to users C, D, and E and receives their data streams, prioritizes and multiplexes their streams, and then sends their prioritized multiplexed streams back to each of those users. As indicated in for example FIG. 5, the parent node may be coupled directly or indirectly to one or more other users in addition to the users C, D, and E.

In a second region a private network 179 has a mesh conferencing node 181, indicated as a child node coupled to users F and G. Users F and G transmit their streams up to the child node 181 and receive prioritized multiplexed streams from the child node which include streams from one or more of the other users in the system. The second region is shown as a private network in which the client nodes are within the network in order to maintain privacy. The connection between the client nodes and child node may be an internal network connection or it may be a virtual private network. By contrast, in the first and second regions 171 and 175 the client nodes are shown as being outside of the data center in their connection.

FIG. 9 is provided as an example of a more complex network architecture system with more users and more regions and data centers. It is also a hybrid system with a private network and a public network. Additional data centers and networks may be coupled into the mesh networking system and each connection between mesh conferencing nodes may be scaled to maintain bandwidth limitations or to maintain quick processing by the node hardware.

Figure 10:
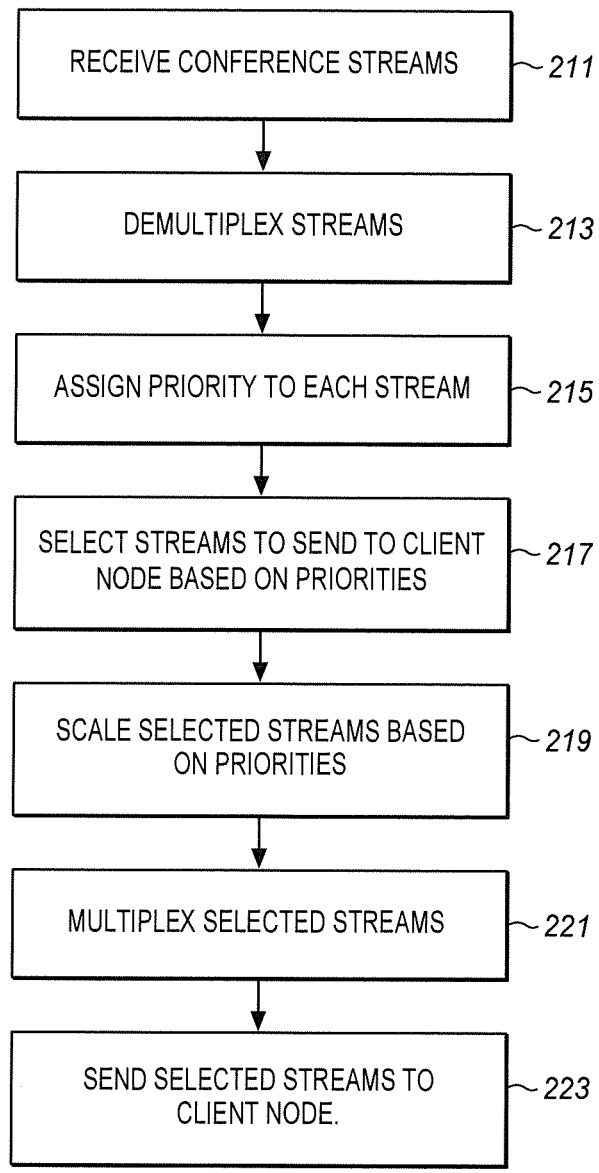
FIG. 10 is a process flow diagram of processing incoming streams within a mesh conferencing node in an embodiment.

FIG. 10 is a process flow diagram for operating a mesh conferencing node such as those described and shown above. FIG. 10 relates to operations in receiving streams and sending streams to local client nodes. In FIG. 10, at 211, mesh conferencing node receives a plurality of conference streams. These streams may come from client nodes individually, from client nodes as a bundled or combined stream, or as a multiplexed set of client streams from another mesh conferencing node.

At 213, the received conference streams are demultiplexed into separate constituent components. In the examples described above, the constituent components may include audio, video, text, files to share such as images, spreadsheets, and documents and other interactive elements.

At 215, a priority is assigned to each stream. The priorities may be stored in a prioritization table for use as streams are received from local or remote sources. The priorities may be assigned based on the source of the stream so that more important users such as moderators, speakers, or organizational leaders are assigned a higher priority than less important users. The priorities may be assigned based on the activity of a user at the source of the stream so that a user that is asking a question is assigned a higher priority than one that is not speaking. The priorities may be assigned by activity or status values determined by a machine or they may be determined by a conference moderator. The conference moderator might indicate the speakers or panel members and may give the floor to different client nodes to ask or answer a question as the conference progresses. The priorities may be assigned locally or priority assignments for at least some of the streams may be received from a remote mesh conferencing node.

At 217, streams are selected to send to one or more of the connected client nodes using the priorities stored in the prioritization table. The selection of at least one stream to send to the client node will typically include excluding the stream from the client node. However, a user may request or the system may be configured so that the client's own stream is always echoed back or echoed back to the client on request. The streams that are not excluded will be the higher priority streams. In some cases, each client node will receive the same set of higher priority streams except that each client node will not receive its own stream no matter how high the priority is.

At 219, the selected streams are scaled. The scaling may be based on the assigned priority of each stream. As an example, high priority streams may be scaled very little while low priority streams may be scaled greatly or blocked in whole or in part. The scaling may be done in a variety of different ways depending on the nature of the stream and the communication path over which the stream will be sent. The scaling may be done by compressing the audio, compressing the video, reducing the frame rate of the video, reducing the image size of video, or reducing the detail of the images of the video. Lossless and lossy compression techniques may be used. For video, in particular, transcoding may be applied to decompress the received video, alter its resolution, frame rate or other features and then compress it in its reduced form. In some cases, even though a stream is originally selected to be included in the multiplexed stream to a particular client, that stream may be blocked based on its priority or based upon inactivity at the source of the stream.

At 221, the selected, scaled streams are multiplexed before being sent to the corresponding client node. At 223, the selected, scaled, multiplexed streams are sent to the corresponding client node. The client node, upon receiving the streams will render them to the user at the client node. This may include demultiplexing the streams, decompressing the streams, and then presenting them on a display and through speakers. The user may be able to select particular ones of the streams for display or for display in a particular part of the client node.

Figure 11:
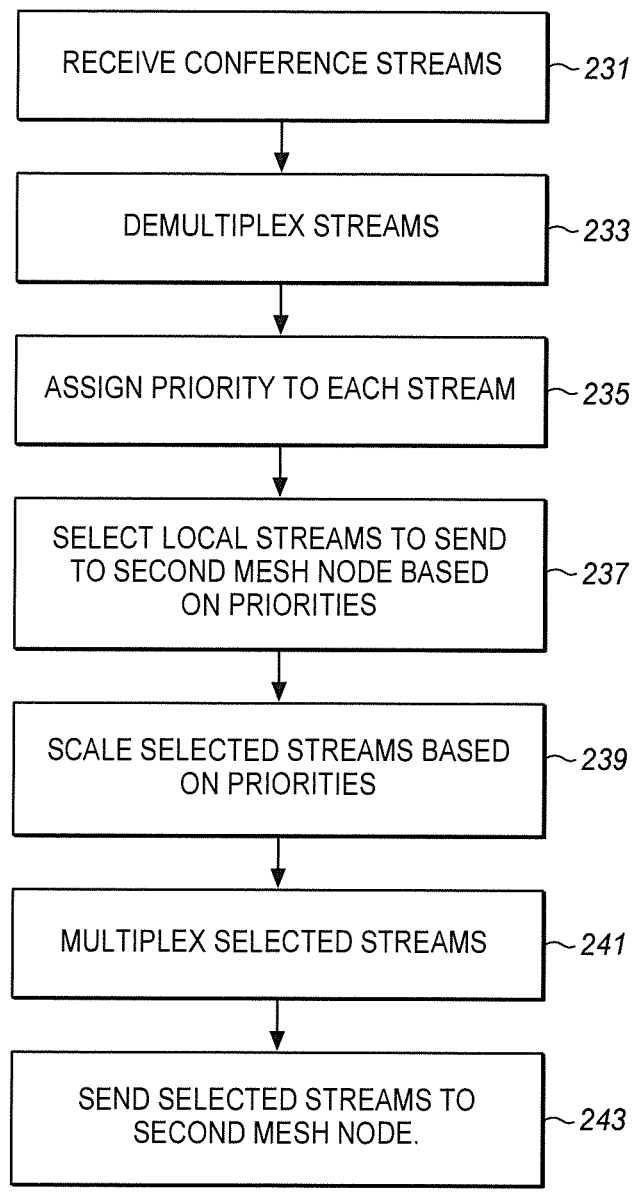
FIG. 11 is a process flow diagram of processing incoming streams within a mesh conferencing node in another embodiment.

FIG. 11 is another process flow diagram for operating a mesh conferencing node such as those described and shown above. These operations relate to receiving streams and sending at least some of the streams to another mesh conferencing node. In FIG. 11, at 231, the mesh conferencing node receives a plurality of conference streams. These streams may come from client nodes individually, from client nodes as a bundled or combined stream, or as a multiplexed set of client streams from another mesh conferencing node.

At 233, the received conference streams are demultiplexed into separate constituent components. At 235, a priority is assigned to each stream using, for example a prioritization table. The priorities may be assigned before or after the streams are received. The assignments may also be changed during a conference based on changes in user behavior and changes in the dynamics of the conference.

At 237, streams are selected to be sent to another mesh conferencing node. This second node may be local but dedicated to serving other users. It may be a remote node at a different location, a different data center, or a different network. The remote network may a private network or a virtual private network, depending upon the network topologies available to those client nodes participating in the conference. The at least one stream selected to send to the second mesh conferencing node may be selected based on the assigned priorities. In this selection any stream receiving from the second mesh conferencing node may be excluded. This reduces the network bandwidth requirements. The selection may also exclude any remote streams. The first node may identify each stream that is has received as either local or remote and send only the local streams to the remote second mesh conferencing node. In addition or instead, the assigned priorities may be used to select a subset of the local streams to send to the remote second mesh conferencing node. In this way low priority local streams may be excluded.

At 239, the selected streams may be scaled based on assigned priorities so that higher priority streams come across more clearly and with higher fidelity than lower priority streams. At 241, the scaled streams are multiplexed to form a single stream and at 243, the streams are sent to the mesh conferencing node.

While the operations are shown as all being performed and in a particular sequence, some of the operations may be removed and reordered depending on the particular implementation. For example, it is not necessary that any streams be scaled. The streams may be sent as is with only some streams being excluded based on priority and based on the destination for the streams. Similarly, it is not necessary that the streams be multiplexed. The streams may be sent as separate streams. If a particular mesh conferencing node is not coupled directly to any client nodes, then the operations for selecting and sending streams to client node may be removed. Similarly, if the mesh conferencing node is not coupled to any other mesh conferencing nodes, then the operations for sending streams to another node may be removed.

Figure 12:
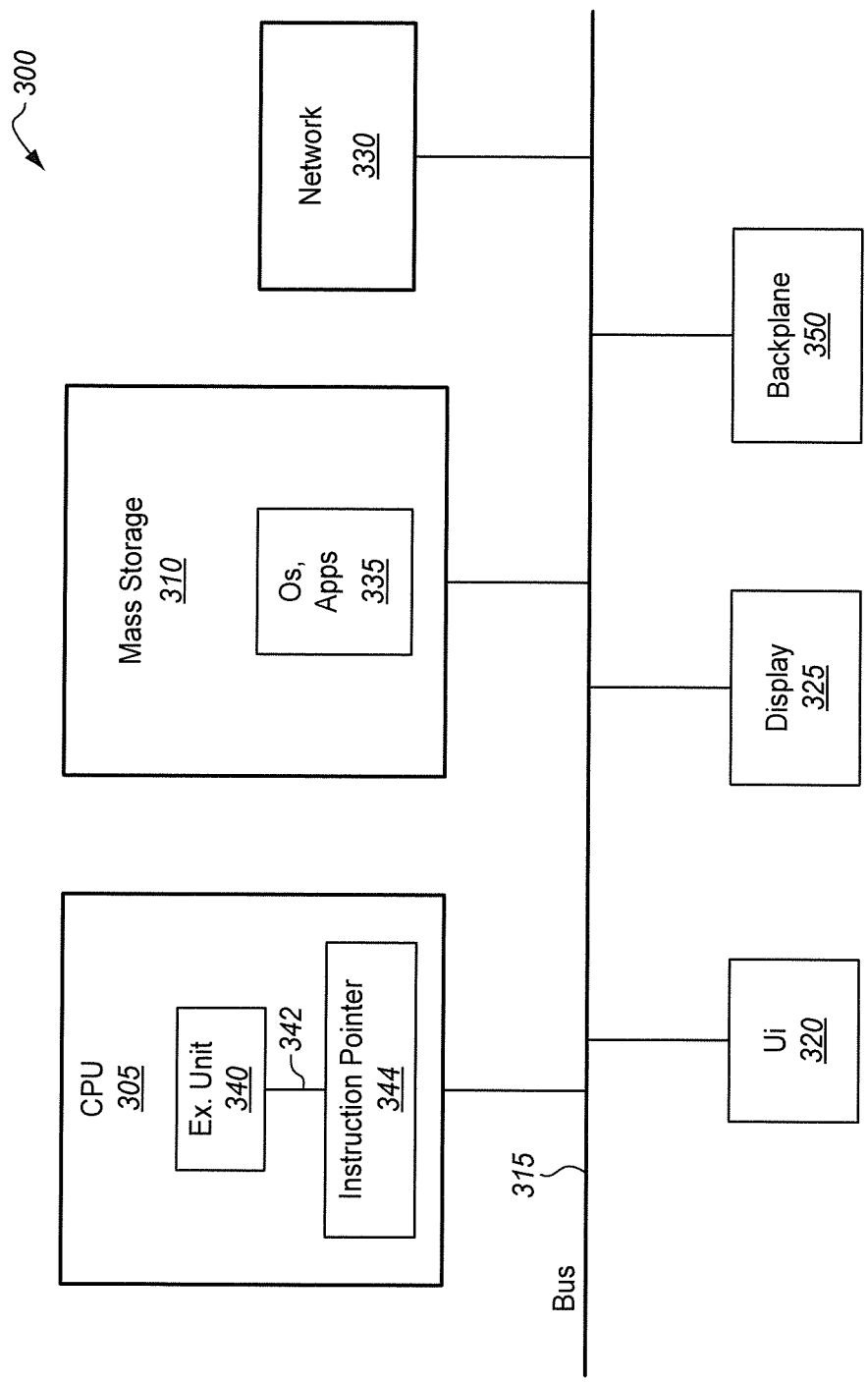
FIG. 12 is a block diagram of a network node suitable for use with the embodiments of FIGS. 1-11.

FIG. 12 shows a block diagram illustrating an exemplary computer system 300, suitable for use as a node or network processor according to one embodiment of the invention. The exemplary computer system 300 includes a processor 305 coupled to a storage device 310 by a bus 315. In addition, a number of user input/output devices, such as a keyboard 320 and a display 325, may also be coupled to the bus 315, but are optional parts. A network 330 interface and a backplane 350 interface may also be coupled to bus 315, for example through the chassis 323. The processor 305 (single or multi core; and if multi core, symmetrical or asymmetrical cores) includes at least a central processing unit of any type of architecture, such as CISC, RISC, VLIW, or hybrid architecture. The processor 305 may also include a graphics processing unit (e.g., one or more cores), graphic bus interface(s), a memory management unit, and main memory bus interface(s). Furthermore, the processor 305 may be implemented on one or more die within the same chip.

The storage device 310 and network traffic represents one or more machine-readable media. Thus, machine-readable media include any mechanism that provides (i.e., stores and/or transmits) information in a form readable by a machine (e.g., a computer). For example, a machine-readable medium may be machine-readable storage media (e.g., magnetic disks; optical disks; random access memory; read only memory; flash memory devices), machine-readable communication media (e.g., electrical, optical, acoustical or other form of propagated signals such as carrier waves, infrared signals, digital signals, etc.); etc. The bus 315 represents one or more busses and bridges (also termed as bus controllers). While this embodiment is described in relation to a single processor computer system, other embodiments could include a multi-processor computer system.

FIG. 12 also illustrates that the storage device 310 has stored therein stream prioritization software 335 for execution on the processor 305 to provide for the scaling and multiplexing of received and transmitted streams. Of course, the storage device 310 preferably contains additional software such as an operating system and various applications (not shown).

FIG. 12 additionally illustrates that the processor 305 includes an execution unit 340, an internal bus 342, and an instruction pointer register 344. Of course, processor 310 contains additional circuitry, which is not necessary to understanding this description.

The internal bus 342 couples several of the elements of the processor 305 together as shown. The execution unit 340 is used for executing instructions. The instruction pointer register 344 is used for storing an address of an instruction currently being executed by the execution unit 340.

A network element (e.g., client node, mesh conferencing node) may be an end station, a router, a bridge, or specifically adapted device and is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

The techniques shown in the figures can be implemented using code and data stored and executed on one or more electronic devices (e.g., a client or mesh node or other network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:
1. A method comprising:
receiving a plurality of conference streams at a network interface of a mesh conferencing node of a multi-party mesh networking system at least one stream being received from a downstream client node and at least one stream being received from an upstream mesh conferencing node of the multi-party mesh networking system;
assigning a priority to each stream including receiving a priority assignment for at least some of the streams from a remote mesh conferencing node;
identifying each stream as either local or remote and sending the local streams to the upstream mesh conferencing node;
selecting a subset of the local streams to send to the upstream mesh conferencing node using the assigned priorities;

selecting at least one stream to send to the downstream client node based on the assigned priorities using a processor of the mesh conferencing node; and sending the selected streams to the downstream client node from the network interface of the mesh conferencing node.

2. The method of claim 1, wherein selecting at least one stream comprises selecting a plurality of streams, the method further comprising multiplexing the selected streams before sending the selected streams to the client node.

3. The method of claim 2, further comprising scaling the selected streams based on the assigned priority before multiplexing the streams.

4. The method of claim 3, wherein scaling the streams comprises at least one of compressing audio, compressing video, reducing a frame rate of video, reducing an image size of video, reducing detail of an image, and transcoding video.

5. The method of claim 1, wherein selecting at least one stream to send to the client node comprises excluding the stream from the client node.

6. The method of claim 1, further comprising selecting at least one stream to send to a second mesh conferencing node based on the assigned priorities.

7. The method of claim 6, wherein selecting at least one stream to send to the upstream mesh conferencing node comprises excluding any stream received from the upstream mesh conferencing node.

8. The method of claim 1, wherein assigning a priority comprises assigning a priority based on at least one of the source of the stream, the activity of a user at the source of the stream, a designation of a user at the source of the stream as at least one of presenter, leader, panel member, and moderator, and recognition of a user at the source of the stream by a conference moderator.

9. A non-transitory machine-readable medium having instructions that when operated on by the machine cause the machine to perform operations comprising:
receiving a plurality of conference streams at a mesh conferencing node of a multi-party mesh networking system at least one stream being received from a downstream client node and at least one stream being received from an upstream mesh conferencing node of the multi-party mesh networking system;
assigning a priority to each stream including receiving a priority assignment for at least some of the streams from a remote mesh conferencing node;
identifying each stream as either local or remote and sending the local streams to the upstream mesh conferencing node;
selecting a subset of the local streams to send to the upstream mesh conferencing node using the assigned priorities;
selecting at least one stream to send to the downstream client node based on the assigned priorities; and
sending the selected streams to the downstream client node.

10. The medium of claim 9, wherein selecting at least one stream comprises selecting a plurality of streams, the operations further comprising multiplexing the selected streams before sending the selected streams to the client node.

11. The medium of claim 9, the operations further comprising scaling the streams by at least one of compressing audio, compressing video, reducing a frame rate of video, reducing an image size of video, reducing detail of an image, and transcoding video.

12. A mesh conferencing node of a multi-party mesh networking system coupled to a plurality of downstream client nodes and to a second upstream mesh conferencing node, the mesh conferencing node comprising:
a client network interface to receive a plurality of conference streams from the plurality of client nodes and a plurality of streams from the upstream mesh conferencing node;
a demultiplexer to demultiplex the received conference streams;
a prioritization table having priority assignments for each conference stream including priority assignments for at least some of the streams received from a remote mesh conferencing node;
a controller to identify each stream as either local or remote and to select a subset of the local streams to send to the upstream mesh conferencing node using the assigned priorities;
a multiplexer to multiplex the selected subset of demultiplexed conference streams based on priorities from the prioritization table; and
a mesh network interface to the second mesh conferencing node to send the multiplexed conference streams to the second mesh conferencing node.

13. The node of claim 12, wherein the mesh network interface is further to receive further conference streams from further client nodes, and wherein the multiplexer excludes any streams received from the second mesh conferencing node.

14. The node of claim 12, further comprising a client node multiplexer for each of the plurality of client nodes to multiplex conference streams for each client node based on the priority assignments and wherein the client network interface sends the respective multiplexed stream to each respective client node.

15. A mesh conferencing node of a multi-party mesh networking system comprising:
a client node interface coupled to at least two different downstream client nodes to receive a conference stream from each of the two different client nodes;
a demultiplexer to demultiplex each received conference stream into constituent components;
a controller to identify each stream as either local or remote and to select a subset of the local streams to send to the upstream mesh conferencing node using the assigned priorities;
a prioritization table having a priority for each client node including priority assignments for at least some of the streams received from a remote mesh conferencing node;
a scaler to scale the constituent components of each stream based on the priority of the respective client node;
a multiplexer to combine the scaled components to form a single output stream; and
a network interface to send the single output stream to a coupled upstream mesh conferencing node and to send the local streams to the upstream mesh conferencing node.

16. The node of claim 15, wherein the network interface is further to receive at least one multiplexed conference stream containing conference streams from a plurality of remote client nodes, the node further comprising a remote node demultiplexer to demultiplex the remote client node conference stream into constituent components.

17. The node of claim 16, further comprising an output multiplexer for each client node to each multiplex the scaled components and the remote client components to form a single output stream for each client node.

18. The node of claim 17, wherein each respective client output multiplexer excludes the scaled components received from its respective client node.

19. The node of claim 15, wherein the scaler is to alternately compress, block, scale, or pass each constituent component based on the priority of the respective client node.

* * * * *